(12) United States Patent
Moon

(10) Patent No.: US 8,421,954 B1
(45) Date of Patent: Apr. 16, 2013

(54) REFLECTIVE LIQUID CRYSTAL DISPLAY DEVICE HAVING AN AUXILIARY LIGHT SOURCE DEVICE WITH A UNIFORM LIGHT DISTRIBUTION

(75) Inventor: Jeongmin Moon, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 641 days.

(21) Appl. No.: 09/589,881

(22) Filed: Jun. 9, 2000

(30) Foreign Application Priority Data

Jun. 10, 1999 (KR) .................. 1999-21483

(51) Int. Cl.
*G02F 1/1335* (2006.01)
*F21S 8/10* (2006.01)

(52) U.S. Cl.
USPC .............. 349/62; 349/61; 349/63; 349/64; 349/65; 362/615

(58) Field of Classification Search ........... 349/61, 349/62; 346/61–65; 362/615
See application file for complete search history.

(56) References Cited

U.S. PATENT DOCUMENTS

| | | | | |
|---|---|---|---|---|
| 5,341,231 A | * | 8/1994 | Yamamoto et al. | 359/49 |
| 5,575,549 A | * | 11/1996 | Ishikawa et al. | 362/625 |
| 5,584,556 A | | 12/1996 | Yokoyama et al. | |
| 6,011,602 A | * | 1/2000 | Miyashita et al. | 349/65 |
| 6,136,624 A | * | 10/2000 | Kemmochi et al. | 438/30 |
| 6,154,262 A | * | 11/2000 | Ogura | 349/61 |
| 6,259,854 B1 | * | 7/2001 | Shinji et al. | 385/146 |
| 6,264,343 B1 | * | 7/2001 | Miyashita et al. | 362/31 |

FOREIGN PATENT DOCUMENTS

| | | |
|---|---|---|
| EP | 0 878 720 A1 | 11/1998 |
| EP | 0878720 | * 11/1998 |
| JP | 6-324331 | 11/1994 |
| JP | 7225323 | 8/1995 |
| JP | 410172318 A | * 6/1998 |

* cited by examiner

*Primary Examiner* — Hoan C Nguyen

(74) *Attorney, Agent, or Firm* — Birch, Stewart, Kolasch & Birch, LLP

(57) ABSTRACT

An auxiliary light source device for a reflective liquid crystal display device includes a light source; a light directing member for directing incident light from the light source toward the reflective liquid crystal display device, the directing member having upper and lower surfaces, the lower surface having a plurality of convex portions protruding from the lower surface of the display device, each of the convex portions having a substantially planar surface at its end, the planar surface of the convex portion being substantially parallel to the lower surface; and a light reflecting member which guides light from the light source into the light directing member.

18 Claims, 4 Drawing Sheets

REFLECTIVE LIQUID CRYSTAL DISPLAY DEVICE HAVING AN AUXILIARY LIGHT SOURCE DEVICE WITH A UNIFORM LIGHT DISTRIBUTION

BACKGROUND OF THE INVENTION

1. Field of the Invention

This invention relates to a reflective liquid crystal display device, more particularly to a reflective liquid crystal display device having an auxiliary light source.

2. Description of Related Art

In general, liquid crystal displays are divided into transmissive liquid crystal display devices and reflective liquid crystal display devices according to whether the display uses an internal or outer light source.

While the transmissive liquid crystal display device uses an internal light source such as a backlight, the reflective liquid crystal display device uses ambient light and thus is affected by its surroundings. For example, the brightness of ambient light in an office differs largely from that outdoors. Also, even in the same location, the brightness of ambient light depends on the time of day (e.g., noon or dusk). An auxiliary light source device for the reflective liquid crystal display device is mainly used when its surroundings get dark.

FIG. 1 shows an auxiliary light source device for the reflective liquid crystal display device which has a light-directing member. The auxiliary light source device includes a light source 63, a lamp reflector 65 and a light-directing member 67. The auxiliary light source device is mounted on a liquid crystal display panel 61 having a reflector 71.

The light source 63 is located adjacent to an end 67a of the light-directing member 67, and most of the light source 63 is surrounded by the lamp reflector 65. The end 67a constitutes a surface through which the incident light from the light source 63 is emitted. The light-directing member 67 also has upper and lower surfaces 67b and 67c. A wall-reflector 69 is mounted along the side walls of the light-directing member 67 other than the emitting surface 67a in order to direct the incident light the incident light from the light source 63 is emitted. The light-directing member 67 also has upper and lower surfaces 67b and 67c. A wall-reflector 69 is mounted along the side walls of the light-directing member 67 other than the emitting surface 67a in order to direct the incident light toward the liquid crystal display panel 61 disposed under the light-directing member 67.

The emitted light from the light source 63 is directed toward the surface 67a of the light-directing member 67 and to the inside of the light-directing member 67 by the lamp reflector 65. The light-directing member 67 directs the incident light toward the liquid crystal display panel 61. The light transmitted to the liquid crystal display panel 61 is reflected by the reflector 71 and is emitted toward the observer 73.

It should be noted that the auxiliary light source device is mounted on the liquid crystal display panel. Thus, there cannot be a diffusion plate and lens sheet between the liquid crystal display panel and the light-directing member, unlike in a transmissive liquid crystal display device. In order to produce a uniform emitted light distribution, the following four conditions are preferred for the auxiliary light source device of the reflective liquid crystal display device.

First, an incident light from the light source should be directed only toward the liquid crystal display panel and not the observer. Second, the incident light from the light source should be emitted perpendicular to the liquid crystal display panel. Third, the incident light from the light source should be distributed uniformly toward the liquid crystal display panel by the light-directing member. Fourth, the auxiliary light source device should be designed to minimize undesired effects such as a surface reflection and an angle distortion of the incident light from the auxiliary light source by the light-directing member.

Surface light source devices that have a diffusing plate and a lens sheet to increase the brightness are disclosed in U.S. Pat. Nos. 5,584,556 and 5,575,549. But these devices are used for the transmissive liquid crystal display, and the diffusion plate and the lens sheet disposed between the liquid crystal panel and the light-directing member, as explained previously, are not suitable for the reflective liquid crystal display device.

SUMMARY OF THE INVENTION

An object of this invention is to provide an auxiliary light source device of a reflective liquid crystal display device with a high light utilization efficiency and improved display characteristics.

In order to achieve these and other objects, the present invention provides an auxiliary light source device for a reflective liquid crystal display device having a reflector, the auxiliary light source device including a light source extending along a width of the reflector, to emit light along a length of the reflector, and a light directing device located above the reflector and adjacent to the light source to direct light from the light source to the reflector such that a light distribution of the directed light is substantially uniform along the length of the reflector, and such that the directed light is substantially perpendicular to the reflector.

According to another aspect of the invention, an auxiliary light source device for a reflective liquid crystal display device having a reflector includes an upper reflective surface to reflect impinging light above a certain incidence angle, a lower reflective surface having a plurality of convex portions extending toward the reflector to direct light from the auxiliary light source device to the reflector, and an entry surface connecting the upper and lower reflective surfaces through which light from a light source enters.

BRIEF DESCRIPTION OF THE DRAWINGS

For a more complete understanding of the invention and its advantages, reference is now made to the following descriptions taken in conjunction with the accompanying drawings, in which.

DETAILED DESCRIPTION OF PREFERRED EMBODIMENTS

Figure 1:
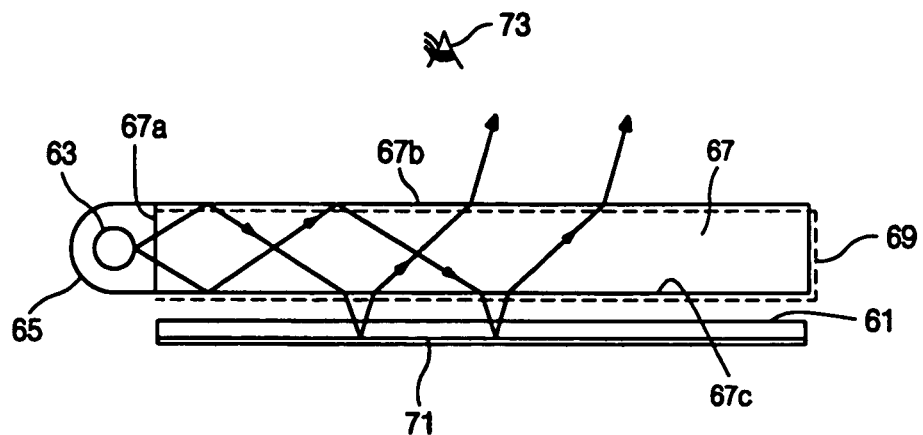
FIG. 1 is a sectional view showing a prior art structure of a reflective liquid crystal display device having an auxiliary light source device.
Figure 2:
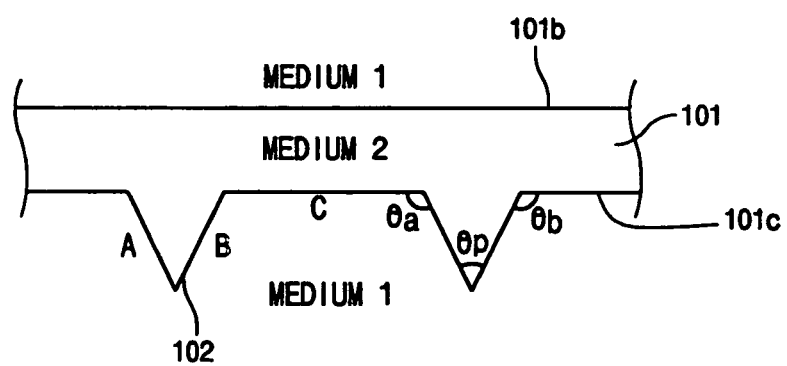
FIG. 2 is a schematic view illustrating a principle of light refraction in a light directing member having pyramid shaped convex portions.

In order to find an appropriate shape of the light directing member of the auxiliary light source device for the reflective liquid crystal display device, a light directing member having pyramid-shaped convex portions 102 formed on the lower surface thereof and oriented downward is examined, as illustrated in FIG. 2.

Since the lower surface 101c of the light-directing member 101 has a large number of pyramid-shaped convex portions 102 in order to increase the brightness, the direction of the incident light from the light source will be altered by these convex portions. Thus, if the size, shape and position of the pyramid-shaped convex portions 102 are appropriately selected, it is possible to produce a relatively uniform emitting light distribution on the liquid crystal display panel (not shown). Further, an arrangement of these convex portions 102 can be varied according to the amount of the emitting light to produce a uniform emitting light distribution.

In order to find the size, shape and position of these convex portions 102 suitable for producing a uniform emitting light distribution, several tests were performed. The lower surface 101c of the light-directing member 101 is a boundary between media 1 and 2. The boundary has boundary surfaces A, B and C, and an angle θa exists between boundary surfaces A and C. An angle θb exists between boundary surfaces B and C and an angle θp exists between the boundary surfaces A and B.

In such a structure with pyramid-shaped convex portions 102, the closer the angle θa or the angle θb become to 90°, the more perpendicularly the incident light is directed to the liquid crystal display panel. Namely, when the surface A or the surface B becomes perpendicular to the surface C, the angle θp between the surfaces A and B becomes zero and the emitting light is directed more perpendicularly toward the liquid crystal display panel.

Thus, in the structure shown in FIG. 2, the angle θp between the surfaces A and B is preferably smaller than 10°, but such a structure cannot be manufactured easily.

Figure 3:
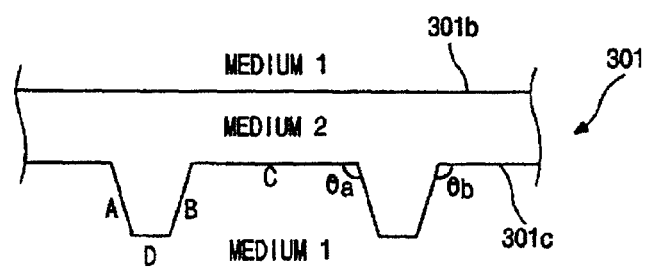
FIG. 3 is a schematic view illustrating a principle of light refraction in light directing member according to an embodiment of the invention.

FIG. 3 shows a more practical shape of the lower surface of the light directing member, which has a main surface C. Surfaces A, B and D together define a convex portion oriented toward the lower reflector (not shown). The angles θa and θb between the surfaces A and C, and between the surfaces B and C, respectively, approach 90°, and the surface D is substantially parallel to the surface C. This convex portion of the lower surface, which can alter the incident angle of reflected light to an angle close to 90°, is relatively easy to manufacture.

Further, to produce a uniform emitting light distribution toward the liquid crystal display panel (not shown), it necessary to control the amount of the emitted light according to a distance from the light source on the lower surface 301c of the light directing member 301.

In this structure, the surfaces C and D of the lower surface 301c and the upper surface 301b effect a total reflection for incidence angles above a certain value, and thus it is necessary to arrange the convex portions of the lower surface 301c properly.

Figure 4A:
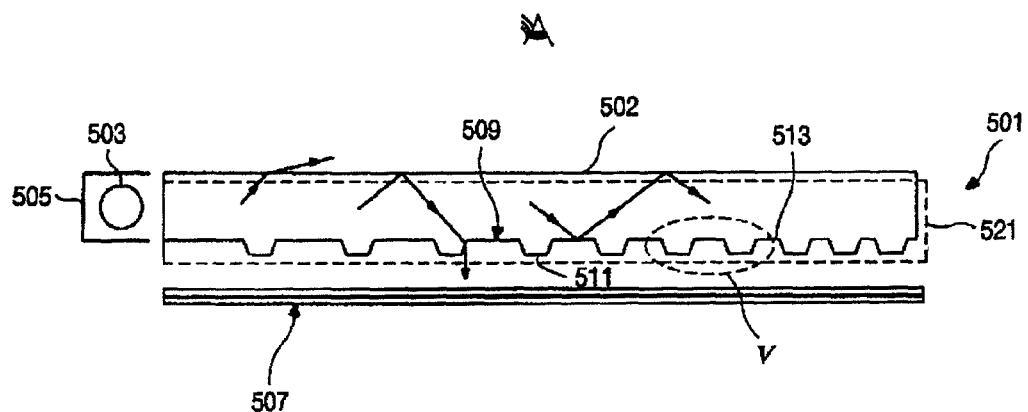
FIGS. 4A and 4B are a schematic sectional view illustrating distribution of the convex portions of the light directing member according to the invention.

FIG. 4A shows paths of the emitting light in the light-directing member according to an embodiment of the present invention. In FIG. 4A, light generated by a light source 503 is directed by reflector 505 to enter a side of light directing member 501. The entering light reflects off of upper surface 502 and lower surface 509, due to the presence of side wall reflector 521. The lower surface 509 has a plurality of convex portions, a lower surface of which is shown as 511. When light strikes a side of one of these convex portions, it is directed downward substantially perpendicular to the reflector 507.

Figure 4B:
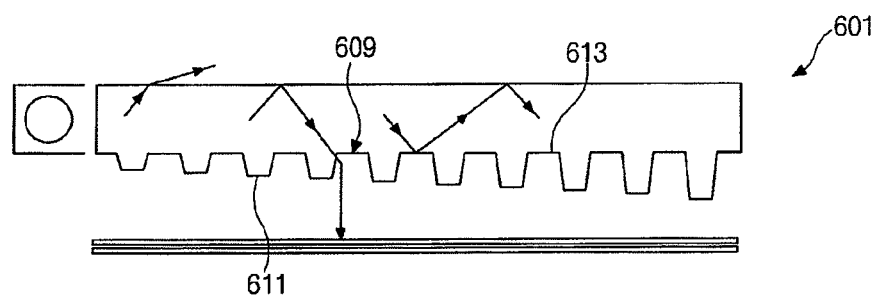

In order to distribute, uniformly, the emitting light on the liquid crystal display panel, if it is assumed that all sizes of the convex portions are same, it is required that a distance between adjacent convex portions becomes smaller as the convex portions become more distant from the light source. Alternately, a uniform distribution may be achieved by increasing a size of the convex portions with increasing distance from the light source. As shown FIG. 4B, light generated by a light source is directed by reflector to enter a side of light directing member 601. The entering light reflects off of upper surface and lower surface 609, due to the presence of side wall reflector. The lower surface 609 has a plurality of convex portions 611 wherein a size of the plurality of convex portions 611 increases with increasing distance from the light source. When light strikes a side of one of these convex portions 611, it is directed downward substantially perpendicular to the reflector.

Figure 5:
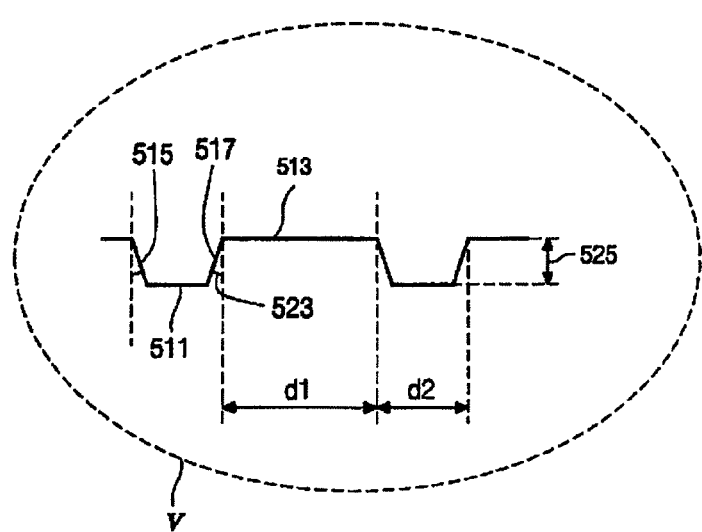
FIG. 5 is an enlarged view of the "V" portion of FIG. 4A, showing a lower portion of the light directing member.

FIG. 5 is an enlarged view of the "V" portion of FIG. 4A, showing a lower portion of the light directing member. As shown in FIG. 5, it is preferable that an angle 523 between boundary surfaces 515 or 517 and a line perpendicular to a planar (which is a portion of the lower surface of 509 shown in FIG. 4A) is about between 0° and 10°. That is, it is desirable that an angle between boundary surfaces 515 or 517 and surface 513 is between 90° and 100°.

In addition, it is preferred that a width d2 of the convex portions is less than 100 μm, a height 525 of the convex portions is less than 50 μm and a distance d1 between two adjacent convex portions is variable between 10 μm and 1000 μm. However, other geometries will become apparent to those skilled in the art with the aid of this specification.

Figure 6A:
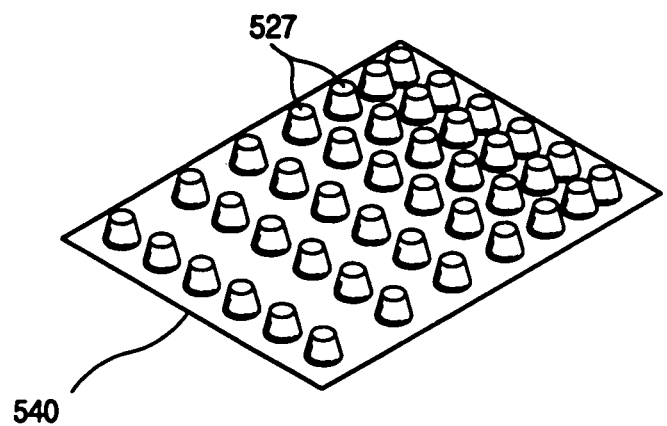
FIGS. 6a to 6c are schematic perspective views of the directing member according to the modifications of the invention, where the views are upside down for better understanding.
Figure 6B:
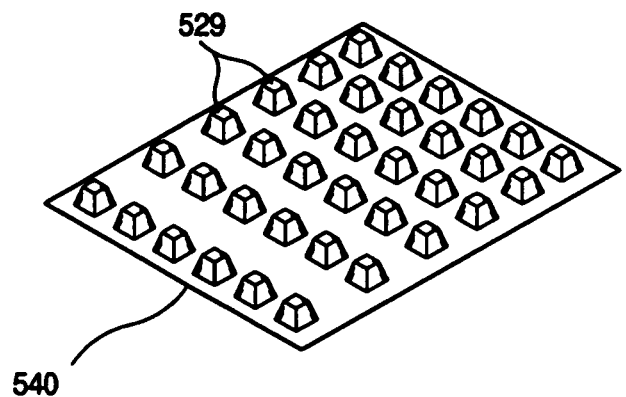
Figure 6C:
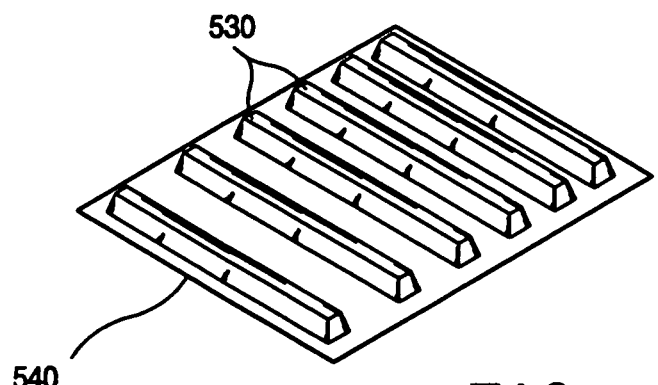

FIGS. 6a to 6c are perspective views showing several applicable shapes fabricated with reference to above-mentioned values, but illustrate the shapes of the convex portions upside down. That is, the "tops" of the surfaces shown in FIGS. 6a-6c are oriented toward the lower reflector (e.g., 507 in FIG. 4A).

As shown in the figures, the plane surface (corresponding to surface 511 in FIG. 5) of the convex portions can be varied among, e.g., a circular shape 527, a rectangular shape 529 and a bar shape 530. Light from the light source enters the portions of the light directing members shown in FIGS. 6a-6c at respective sides 540.

As explained above, since the auxiliary light source device according to the invention has a light directing member having a plurality of convex portions on its lower surface, which are arranged closer as they are positioned more distant from the light source, the amount of the light emitted to the liquid crystal display panel is uniformly distributed. Furthermore, since the convex portions have substantially vertical surfaces, the light from the light source can be directed to the panel perpendicularly.

Although preferred embodiments and advantages thereof have been described heretofore, variations and changes are possible by the skilled in the art without departing from the spirit and scope of the invention, which will be indicated by the following claims.

What is claimed is:

1. An auxiliary light source device for a reflective liquid crystal display device having a reflector, the auxiliary light source device comprising:
   a light source;

a light directing member for directing incident light from the light source toward the reflector outwardly along an orthogonal direction, the light directing member including, an upper surface and a lower surface parallel to each other, the lower surface having a plurality of convex portions extending from the lower surface, each of the plurality of convex portions having a substantially planar surface which is substantially parallel to the lower surface and a side surface connecting the substantially planar surface and the lower surface, and a side surface angle between the side surface of the each convex portion and a line perpendicular to the substantially planar surface is less than 5°, wherein the plurality of convex portions have the same side surface angle with each other, wherein light reflected along an orthogonal direction to the liquid crystal display device is uniform, wherein a ratio of the height to width of the plurality of convex portions is substantially about 1 to 2, and wherein a size of the plurality of convex portions increases with increasing distance from the light source; and a sidewall reflector surrounding the light directing member, and extending lower than the substantially planar surface of the plurality convex portions.

2. The device according to claim 1, further comprising:
a light reflecting member to guide light from the light source into the light directing member.

3. The device according to claim 1, wherein the substantially planar surface of the each convex portion has a substantially circular shape.

4. The device according to claim 1, wherein the substantially planar surface of the each convex portion has a rectangular shape.

5. The device according to claim 1, wherein the plane surface of the plurality of convex portions has a bar shape extending perpendicular to a direction of light propagation in the light directing member.

6. The device according to claim 1, wherein a distance between the lower surface and the substantially planar surface of the each convex portion is less than 50 μm.

7. The auxiliary light source device of claim 1, wherein the angle between the side surface and a line perpendicular to the planar surface is about between 0° and 10°.

8. A reflective liquid crystal display device, comprising:
a display panel including two substrates spaced apart, liquid crystal sandwiched between the two substrates, and a reflector to reflect light through the liquid crystal;
an auxiliary light source device for supplying light to the display panel, including,
a light source,
a light directing member for directing incident light from the light source toward the display panel, the light directing member having an upper surface and a lower surface parallel to each other, the lower surface having a plurality of convex portions, each having a substantially planar surface which is substantially parallel to the lower surface and a side surface connecting the substantially planar surface and the lower surface, a side surface angle between the side surface of the each convex portion and a line perpendicular to the substantially planar surface being less than 5°, wherein the plurality of convex portions have the same side surface angle with each other, wherein light reflected along an orthogonal direction to the display panel is uniform, wherein a ratio of the height to width of the plurality of convex portions is substantially about 1 to 2, and wherein a size of the plurality of convex portions increases with increasing distance from the light source, and a sidewall reflector surrounding the light directing member, and extending lower than the substantially planar surface of the plurality of convex portions; and a light reflecting member which guides light from the light source into the light directing member, said display panel being between said auxiliary light source and said light reflecting member.

9. The auxiliary light source device of claim 8, wherein the angle between the side surface and a line perpendicular to the planar surface is about between 0° and 10°.

10. An auxiliary light source device for a reflective liquid crystal display device having a reflector, the auxiliary light source device comprising:
an upper reflective surface to reflect impinging light above a certain incidence angle;
a lower reflective surface parallel to the upper reflective surface, the lower reflective surface having a plurality of convex portions extending toward the reflector to direct light from the auxiliary light source device to the reflector outwardly along an orthogonal direction;
an entry surface connecting the upper and lower reflective surfaces through which light from a light source enters, wherein each convex portion includes a planar portion which is substantially parallel to the lower reflective surface and side surfaces connecting the planar portion with the lower reflective surface, and a side surface angle between the side surfaces and a line perpendicular to the planar portion is less than 5°, wherein the plurality of convex portions have the same side surface angle with each other, wherein light reflected along an orthogonal direction to the liquid crystal display device is uniform, wherein a ratio of the height to width of the plurality of convex portions is substantially about 1 to 2, and wherein a size of the plurality of convex portions increases with increasing distance from the light source; and a sidewall reflector surrounding the auxiliary light source device, and extending lower than the planar portions of the plurality of convex portions.

11. The device according to claim 10, wherein the each planar portion is substantially parallel to the lower reflective surface.

12. The device according to claim 10, wherein a cross section of the each convex portion is substantially circular.

13. The device according to claim 10, wherein a cross section of the each convex portion is rectangular.

14. The device according to claim 10, wherein the each convex portion extends along substantially an entire width of the reflective liquid crystal display device.

15. The device according to claim 10, wherein the plurality of convex portions are spaced along the lower surface to ensure a uniform distribution of light along a length of the device.

16. The auxiliary light source device of claim 10, wherein the angle between the side surface and a line perpendicular to the planar surface is about between 0° and 10°.

17. An auxiliary light source device for a reflective liquid crystal display device having a reflector, the auxiliary light source device comprising:
a light source extending along a width of the reflector, to emit light along a length of the reflector;
a light directing device located above the reflector and adjacent to the light source to direct light from the light source to the reflector outwardly along an orthogonal direction such that a light distribution of light directed by the light directing device is substantially uniform along the length of the reflector, and such that the directed light is substantially perpendicular to the reflector, and the light directing device includes an upper surface, a lower surface parallel to the upper surface and a plurality of portions each extending from the lower surface toward the reflector at a 90° angle with respect to the lower or upper surface such that the light reflected outwardly along an orthogonal direction to the liquid crystal display device is uniform, wherein each portion includes a planar surface which is substantially parallel to the lower surface, wherein a ratio of the height to width of the portions is substantially about 1 to 2, and wherein a size of the plurality of portions increases with increasing distance from the light source; and a sidewall reflector surrounding the light directing device, and extending lower than the planar surfaces of the plurality of portions.

18. The device according to claim 17, wherein each of the plurality of portions includes the planar surface parallel to a lower surface of the light directing device and connected to the lower surface by at least one side oriented substantially perpendicular to the lower surface.

* * * * *